United States Patent
Kelley et al.

(10) Patent No.: US 8,865,100 B2
(45) Date of Patent: Oct. 21, 2014

(54) MONETIZING REMOTE GAS USING HIGH ENERGY MATERIALS

(75) Inventors: Bruce T. Kelley, Kingwood, TX (US); Harry W. Deckman, Clinton, NJ (US); Stephen Mark Davis, Humble, TX (US); Frank Hershkowitz, Basking Ridge, NJ (US)

(73) Assignee: ExxonMobil Upstream Research Company, Houston, TX (US)

( * ) Notice: Subject to any disclaimer, the term of this patent is extended or adjusted under 35 U.S.C. 154(b) by 584 days.

(21) Appl. No.: 12/990,932

(22) PCT Filed: Apr. 9, 2009

(86) PCT No.: PCT/US2009/040089
§ 371 (c)(1),
(2), (4) Date: Nov. 3, 2010

(87) PCT Pub. No.: WO2009/148700
PCT Pub. Date: Dec. 10, 2009

(65) Prior Publication Data
US 2011/0059001 A1    Mar. 10, 2011

Related U.S. Application Data

(60) Provisional application No. 61/130,710, filed on Jun. 2, 2008.

(51) Int. Cl.
*G06Q 30/00* (2012.01)
*G06Q 99/00* (2006.01)
(Continued)

(52) U.S. Cl.
CPC ......... *C01B 31/02* (2013.01); *C01B 2203/1241* (2013.01); *C01B 2203/0233* (2013.01); *C01B 2203/0277* (2013.01); *G06Q 99/00* (2013.01); *C01B 2203/0266* (2013.01); *C01B 3/26* (2013.01); *C01B 3/34* (2013.01); *C01B 33/02* (2013.01); *C01B 35/02* (2013.01)

USPC ........... 423/278; 422/600; 422/625; 423/365; 423/418.2; 423/437.1; 423/635; 705/500

(58) Field of Classification Search
USPC ........... 423/278, 635; 422/600, 625; 700/500; 705/500
See application file for complete search history.

(56) References Cited

U.S. PATENT DOCUMENTS

| 2,364,742 A | 12/1944 | Merriam ........................... 75/67 |
| 2,805,177 A | 9/1957 | Krebs .............................. 23/212 |

(Continued)

FOREIGN PATENT DOCUMENTS

| EP | 0105827 | 4/1984 | ................ F17D 1/02 |
| WO | WO03-004942 | 1/2003 | |

OTHER PUBLICATIONS

"Stranded Natural Gas Reserves," *Energy Business Daily*, (2007), Author unknown, http://energybusinessdaily.com/oil_gas/stranded-natural-gas-reserves/, 4 pgs.

(Continued)

*Primary Examiner* — Stanley Silverman
*Assistant Examiner* — Syed Iqbal
(74) *Attorney, Agent, or Firm* — ExxonMobil Upstream Research Company Law Dept.

(57) ABSTRACT

The present application is directed to a method and system for monetizing energy. More specifically, the invention is directed to the economically efficient utilization of remote or stranded natural gas resources. The invention includes importing a high energy density material into an energy market and distributing the high energy density material (HEDM) therein. The HEDM is produced from reduction of a material oxide such as boria into the HEDM, which may be boron. The reduction utilizes remote hydrocarbon resources such as stranded natural gas resources.

24 Claims, 3 Drawing Sheets

(51) Int. Cl.
| | |
|---|---|
| *C01B 35/10* | (2006.01) |
| *C01B 33/12* | (2006.01) |
| *C01B 31/18* | (2006.01) |
| *C01B 31/20* | (2006.01) |
| *C01F 5/02* | (2006.01) |
| *C01B 31/02* | (2006.01) |
| *C01B 3/26* | (2006.01) |
| *C01B 3/34* | (2006.01) |
| *C01B 33/02* | (2006.01) |
| *C01B 35/02* | (2006.01) |

(56) References Cited

U.S. PATENT DOCUMENTS

| | | | | |
|---|---|---|---|---|
| 3,264,210 | A | | 8/1966 | Waghorne et al. ............ 208/127 |
| 3,395,055 | A | | 7/1968 | Sparks et al. ................. 149/21 |
| 3,732,084 | A | * | 5/1973 | Nixon ............................ 44/270 |
| 3,911,288 | A | | 10/1975 | Skala ............................ 307/147 |
| 4,046,516 | A | * | 9/1977 | Burton et al. ................. 422/608 |
| 4,187,173 | A | | 2/1980 | Keefer ............................ 210/23 |
| 4,198,475 | A | | 4/1980 | Zaromb ......................... 429/15 |
| 4,230,564 | A | | 10/1980 | Keefer .......................... 210/652 |
| 4,288,326 | A | | 9/1981 | Keefer .......................... 210/637 |
| 4,432,876 | A | | 2/1984 | Keefer .......................... 210/652 |
| 4,434,506 | A | | 2/1984 | Fujiwara et al. .............. 455/53 |
| 4,572,747 | A | | 2/1986 | Sussman et al. .............. 148/3 |
| 4,602,950 | A | | 7/1986 | Singhal et al. ................ 75/133 |
| 4,801,308 | A | | 1/1989 | Keefer ............................ 55/25 |
| 4,816,121 | A | | 3/1989 | Keefer .......................... 204/156 |
| 4,938,939 | A | | 7/1990 | Kuznicki ...................... 423/326 |
| 4,968,329 | A | | 11/1990 | Keefer ............................ 55/25 |
| 5,049,357 | A | | 9/1991 | Matsuno et al. .............. 420/581 |
| 5,082,473 | A | | 1/1992 | Keefer ............................ 55/25 |
| 5,096,469 | A | | 3/1992 | Keefer ............................ 55/25 |
| 5,256,172 | A | | 10/1993 | Keefer .......................... 423/230 |
| 5,326,923 | A | * | 7/1994 | Cooper et al. ................ 585/725 |
| 5,782,952 | A | | 7/1998 | Diaz et al. ..................... 75/10.19 |
| 6,051,050 | A | | 4/2000 | Keefer et al. ................. 95/96 |
| 6,056,804 | A | | 5/2000 | Keefer et al. ................. 95/96 |
| 6,063,161 | A | | 5/2000 | Keefer et al. ................. 95/100 |
| 6,176,897 | B1 | | 1/2001 | Keefer ............................ 95/98 |
| 6,225,359 | B1 | | 5/2001 | O'Rear et al. ................ 518/706 |
| 6,398,853 | B1 | | 6/2002 | Keefer et al. ................. 96/125 |
| 6,406,523 | B1 | | 6/2002 | Connor et al. ................ 96/125 |
| 6,468,694 | B1 | * | 10/2002 | Amendola .................... 429/218.1 |
| 6,514,318 | B2 | | 2/2003 | Keefer ............................ 95/96 |
| 6,514,319 | B2 | | 2/2003 | Keefer et al. ................. 95/101 |
| 6,541,524 | B2 | | 4/2003 | O'Rear et al. ................ 518/700 |
| 6,727,289 | B2 | | 4/2004 | Ionkina et al. ................ 518/715 |
| 7,001,586 | B2 | | 2/2006 | Wang et al. ................... 423/650 |
| 7,176,246 | B2 | | 2/2007 | Rodriguez et al. ............ 518/704 |
| RE40,006 | E | | 1/2008 | Keefer et al. ................. 95/100 |
| 2006/0058564 | A1 | * | 3/2006 | Sills et al. ..................... 585/709 |
| 2008/0282884 | A1 | | 11/2008 | Kelley et al. .................. 95/96 |
| 2008/0282885 | A1 | | 11/2008 | Deckman et al. ............. 95/98 |
| 2008/0282886 | A1 | | 11/2008 | Reyes et al. ................... 95/98 |
| 2008/0282887 | A1 | | 11/2008 | Chance et al. ................. 95/98 |
| 2008/0282888 | A1 | | 11/2008 | Deckman et al. ............. 95/126 |
| 2008/0282892 | A1 | | 11/2008 | Deckman et al. ............. 96/140 |
| 2008/0314244 | A1 | | 12/2008 | Kelley et al. .................. 95/41 |
| 2008/0314245 | A1 | | 12/2008 | Hershkowitz et al. ......... 95/115 |
| 2008/0341246 | | | 12/2008 | Deckman et al. ............. 95/130 |

OTHER PUBLICATIONS

Baudis, et al. (2005) *Boron and Boron Alloys*, Wiley-VCH, pp. 1-14.
Choudhary, T. V. et al. (2001) "Hydrogen Production via Catalytic Decomposition of Methane," *Jrnl. of Catalysis*, v. 199, pp. 9-18.
Cowan, G. R. L. (2001) "Boron: a Better Energy Carrier Than Hydrogen?" http://www.eagle.ca/~gcowan/boron_blast.html, *11th Ann. Hydrogen Conf.*, 11 pgs.
Cowan, G. R. L. (2008) "How Fire Can Be Tamed," *Int. Jrnl. Nuclear Hydrogen Production and Applications*, v. 1, No. 3, pp. 235-248.
Economides, M. et al. (2007) "Compressed Natural Gas: Monetizing Stranded Gas," *Energy Tribune* www.energytribune.com/articles.cfm?aid=643, 6 pgs.
Galvez, M. et al. (2008) "Solar Hydrogen Production via a Two-Step Thermochemical Process Based on MgO/Mg Redox Reactions—Thermodynamic and Kinetic Analyses," *Int'l Jrnl of Hydrogen Energy*, doi:10.1016/j.ijhydene.2008.04.007, 11 pgs.
Gobina, E. (1999) "Report: Third Annual Monetizing Stranded Gas Reserves Conference," *Membrane Technology*, No. 119, pp. 10-11.
Gstoehl, D. et al. (2007) "A Quenching Apparatus for the Gaseous Products of the Solar Thermal Dissociation of ZnO," *Jrnl. of Material Science*, 8 pgs.
Ju, Y. et al. (2005) "Methane Decomposition Into Carbon Fibers Over Coprecipitated Nickel-Based Catalysts," *Journal of Natural Gas Chemistry*, v. 14, pp. 101-106.
Muradov, N. et al. (Unknown) "Catalytic Dissociation of Hydrocarbons: a Route to $CO_2$-Free Hydrogen," *Univ. Central Florida*, 1 pg.
Olsen, S. et al. (2004) "GTL Synthesis Gas Generation Membrane for Monetizing Stranded Gas," *Membrane Technology*, 6 pgs.
Pintassilgo, C. et al. (1999) "Methane Decomposition and Active Nitrogen in a $N_2$-$CH_4$ Glow Discharge at Low Pressures," *Plasma Sources Sci. Tech.*, v. 8, p. 1.
European Search Report dated Dec. 4, 2008, 7 pgs.
PCT International Search & Written Opinion dated May 28, 2009, 11 pgs.

\* cited by examiner

MONETIZING REMOTE GAS USING HIGH ENERGY MATERIALS

CROSS REFERENCE TO RELATED APPLICATIONS

This application is the National Stage of International Application No. PCT/US2009/040089, filed 9 Apr. 2009, which claims the benefit of U.S. Provisional Application No. 61/130,710, filed 2 Jun. 2008. The entirety of each of these applications is incorporated herein by reference for all purposes.

FIELD OF THE INVENTION

This invention relates generally to a method of monetizing energy resources. More specifically, the invention is directed to the economically efficient utilization of remote or stranded natural gas resources.

BACKGROUND

This section is intended to introduce the reader to various aspects of art, which may be associated with exemplary embodiments of the present invention, which are described and/or claimed below. This discussion is believed to be helpful in providing the reader with information to facilitate a better understanding of particular techniques of the present invention. Accordingly, it should be understood that these statements are to be read in this light, and not necessarily as admissions of prior art.

The utilization of natural gas in the world energy market is growing faster than that of any other fossil fuel and is expected to continue to become increasingly important in the foreseeable future. Stranded natural gas reserves are expected to be a major supply source for the natural gas portion of the world energy market. Some sources estimate that stranded natural gas reserves account for about 50% of the total natural gas reserves held by the top 10 countries, and between 2,700 and 3,400 trillion cubic feet (tcf) worldwide. *Stranded Natural Gas Reserves*, Energy Business Daily, Sep. 27, 2007, found at http://energybusinessdaily.com/oil_gas/stranded-natural-gas-reserves/. As suggested by its name, these reserves are in remote or otherwise difficult to access areas. Utilizing and monetizing these stranded natural gas reserves is one of the world's toughest energy challenges.

Significant natural gas resources are located in regions of the world that are remote or otherwise stranded from gas markets and/or infrastructure (e.g., pipelines). Some methods currently considered to commercialize this remote or stranded gas are liquefaction (e.g., LNG), conversion to a liquid (e.g., syncrude or gas to liquid (GTL)), or compressed natural gas (CNG). Note that CNG is not currently in wide commercial use. Major challenges often limit the economic applicability of each of these methods: transportation energy efficiency, conversion energy efficiency, and economic efficiency. Additionally, environmental factors such as the release of green house gasses (GHG) should be considered in any proposed energy solution.

Overall transportation and conversion energy efficiency for liquefaction is reasonably high. The LNG process includes three major components: liquefaction (e.g. conversion), transportation, and re-vaporization/energy conversion (e.g. re-conversion). Combined, the total energy efficiency hovers from about 40% to 50% with the possibility of being over 60% in the near future with advances in the re-vaporization/energy conversion (re-conversion) efficiency. However, the economic efficiency of liquefaction suffers from the high cost of liquefaction plants, regasification terminals, cryogenic storage, and specialized carriers. Initial costs for such operations can easily exceed $2 billion and have high operational costs. As such, liquefaction is generally only a feasible economic option at relatively large quantities for transport over significant distances (over about 1,000 miles).

The economics of the GTL approach is about the same. Even though transportation costs for higher molecular weight liquids (e.g., syncrude, diesel) are lower than for LNG, a major challenge to convert gas to higher molecular weight liquids is overall energy conversion efficiency. Like the LNG process, the GTL process includes three major components: liquids conversion, transportation, and combustion (e.g. re-conversion). Combined, the total energy efficiency is from about 20% to about 30%. The economic efficiency is a little better than for LNG, but not enough to offset the lower energy conversion efficiency.

In some regions, flame stable remote natural gas is flared (burned in the atmosphere) rather than sequestered, sold or cleaned up. This is currently an economic, but wasteful approach to dealing with remote or stranded natural gas reserves. This natural gas may be gas associated with an oil production operation, or sour or acid gas that requires significant processing to be "saleable." Flaring or releasing stranded natural gasses is currently the target of significant regulatory action, but many remediation options are expensive, reducing the economic incentive to treat the gas.

As such, a more energy efficient and economically efficient way to utilize or monetize remote or stranded natural gas resources is desired.

Other related material may be found in D. GSTOEHL, et al., *A Quenching Apparatus for the Gaseous Products of the Solar Thermal Dissociation of ZnO*, J. of Material Science, Accepted 27 Nov. 2007; ECONOMIDES, MICHAEL J. and MOKHATAB, SAEID, *Compressed Natural Gas: Monetizing Stranded Gas*, Energy Tribune, posted on Oct. 8, 2007, found at www.energytribune.com/articles.cfm?aid=643; COWAN, GRAHAM R. L., *Boron: A Better Energy Carrier Than Hydrogen?* Jun. 12, 2007, found at http://www.eagle.ca/~gcowan/boron_blast.html.

SUMMARY

In one embodiment, a method of monetizing energy is provided. The method includes transporting a high energy density material to an energy market from a stranded natural gas reduction process location, wherein the high energy density material is obtained from reduction of a material oxide to the high energy density material using a stranded natural gas reduction process. The method may further include distributing the high energy density material in the energy market; and marketing the high energy density material within the energy market. Additionally, the method may further include producing energy by reacting the high energy density material in a reaction process, wherein the reaction process produces at least the material oxide. The method may further include collecting the material oxide; and transporting the material oxide to the stranded natural gas reduction process location. The method may additionally include providing energy from a stranded natural gas resource; providing the material oxide; transferring energy in a stranded natural gas resource to the high energy density material by reducing the material oxide to the high energy density material using the stranded natural gas reduction process at the stranded natural gas reduction process location; and transporting the high energy density material to the energy market. In addition, these steps may be repeated in a cyclic process.

In another embodiment of the present invention, an alternative method of monetizing energy is provided. The method includes transporting a stranded natural gas resource to a reduction site; transporting a material oxide to the reduction site; reducing the material oxide to a high energy density material using the stranded natural gas resource in a stranded natural gas reduction process at the reduction site; and transporting the high energy density material to an energy market.

In a third embodiment of the present invention, a system for monetizing high energy density materials is provided. The system includes at least a first transportation infrastructure comprising transportation carriers configured to carry a high energy density material to an energy market from a stranded natural gas reduction process location, wherein the high energy density material is based from a material oxide.

In a fourth embodiment of the present invention, a method of producing energy is provided. The method includes providing a remote hydrocarbon and a material oxide; decomposing the remote hydrocarbon into hydrogen (H2) and carbon (C); utilizing the carbon for one of fuel and sales; reducing the material oxide to a high energy density material using the hydrogen; and utilizing the high energy density material for one of fuel and sales.

In a fifth embodiment of the present invention, a system for producing energy is provided. The system includes a reduction site; a first delivery infrastructure to supply a remote gas to the reduction site; a second delivery infrastructure to supply a material oxide to the reduction site; a remote gas decomposition plant for decomposing the remote gas into hydrogen ($H_2$) and carbon (C); a material oxide reduction plant for reducing the material oxide to a high energy density material using the hydrogen from the remote gas decomposition plant; and a transportation infrastructure to transport the carbon and the high energy density material to an energy market.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION

In the following detailed description and example, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

The term "transporting" as used in the present application means carrying materials in large or bulk quantities and may include overland bulk carriers, marine bulk carriers, and pipeline transport. Transporting may refer to import and export of the materials inter-country or intra-country transport.

The term "stranded natural gas resource," as used in the present application, means a natural gas reserve judged to be economically infeasible to transport through pipelines into potential energy markets.

The term "natural gas" as used in the present application means any hydrocarbon gas having methane (e.g. $CH_4$) as the major component (at least about 40% by volume), which may also include varying amounts of ethane, higher hydrocarbons, and contaminants such as water, carbon dioxide, hydrogen sulfide, nitrogen, butane, particulate matter, and crude oil.

The term "energy market" as used in the present application means a country or region that is primarily an importer or consumer of energy (e.g. the United States, Great Britain, China, India) rather than primarily an exporter or producer of energy (e.g., Qatar, Kuwait, UAE, Russia).

The present invention is directed to methods and systems for monetizing energy. More specifically, the disclosure is directed to economically utilizing stranded natural gas reserves by converting such reserves into a high energy density material for transportation to energy markets. The high energy density material is transported to an energy market and distributed in that market to generate energy. The energy generation will produce a material oxide, which may be collected, transported to a reduction location near a stranded natural gas resource, then reduced to form the high energy density material, which may then be transported to the energy market for use in generating energy. The reduction may be accomplished using a hydrocarbon, such as the stranded natural gas. The high energy density material may be selected by calculating the amount of energy per unit volume and unit mass to determine which materials have the highest energy density.

Figure 1:
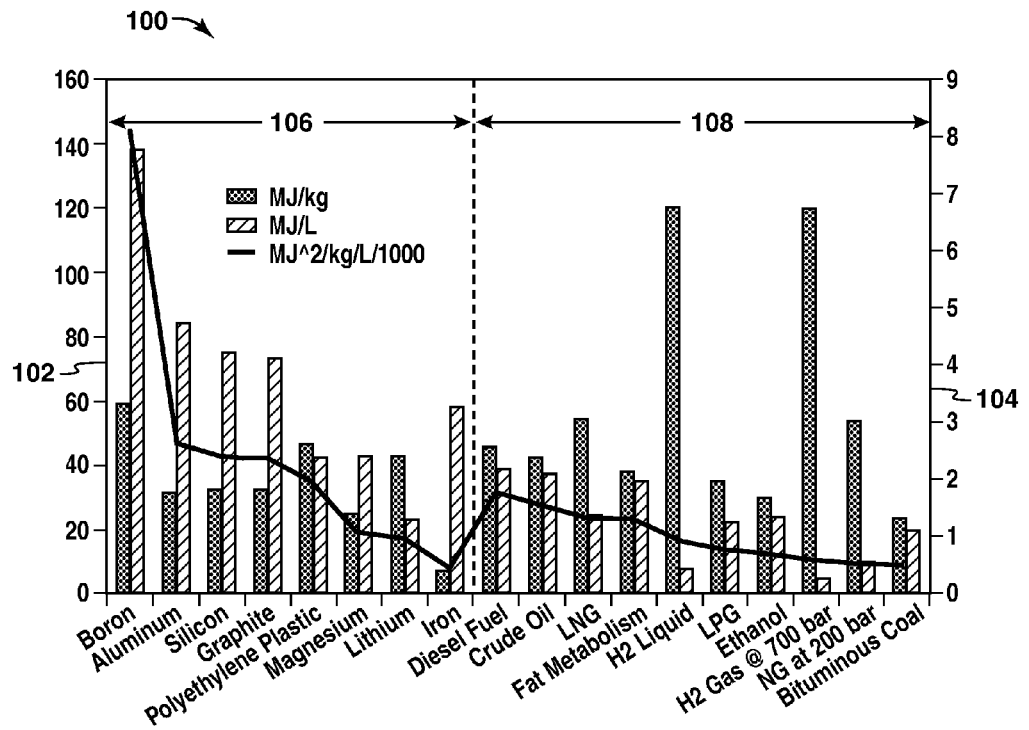
FIG. 1 is a chart of exemplary high energy density materials and their energy concentrations.

Turning now to the drawings, and referring initially to FIG. 1, a chart of exemplary high energy density materials and their energy concentrations. The chart 100 shows a first energy density scale on the left 102 by Mega joules per kilogram (MJ/kg) or Mega joules per liter (MJ/L), a second energy density scale on the right 104 of MJ/kg multiplied by MJ/L divided by 1,000 called the "combined energy density," ($MJ^2$/L/kg)/1,000) and a list of various materials along the bottom horizontal axis of the chart 100. The light vertical bars show energy density by volume (MJ/L) and the dark vertical bars show energy density by mass (MJ/kg), while the jagged line illustrates the combined energy density (($MJ^2$/L/kg)/1,000) of the various materials. The materials to the left of the chart 106 are mostly non-hydrocarbon (except for polyethylene plastic) solid materials and the materials on the right of the chart 108 are hydrocarbon or hydrogen-based materials.

The term "high energy density material," as used herein, refers to any hydrocarbon or non-hydrocarbon material with combined energy density of greater than 1.0 $MJ^2$/kg/L/1000. Exemplary materials that meet this definition include boron, aluminum, silicon, solid carbon (e.g. graphite or diamond (not shown)), polyethylene plastic, and magnesium. Although several materials stand out as having particularly high energy density (e.g. boron, aluminum, silicon, and graphite), it should be noted that many of these materials are already used for other applications. As such, boron and magnesium may be the most attractive materials, but are not the only materials and may not be the most attractive materials based on availability, cost of recovery and other factors.

Figure 2:
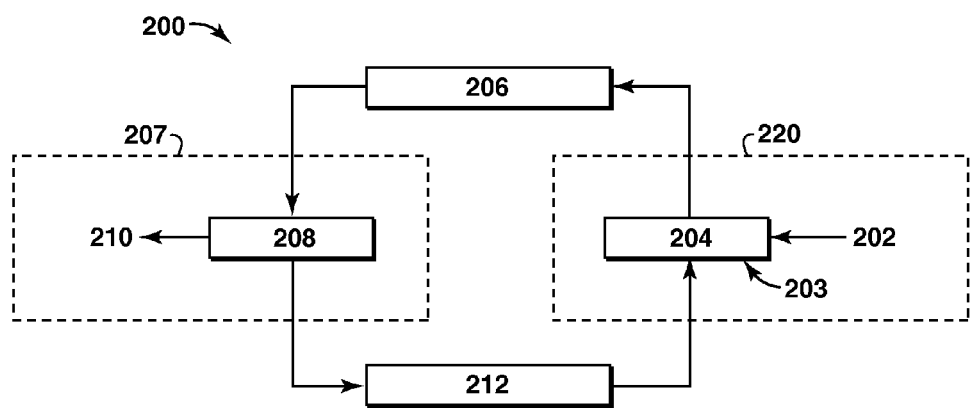
FIG. 2 is an exemplary illustration of a cycle for monetizing energy.

FIG. 2 is an exemplary illustration of a cycle for monetizing energy. The cycle 200 includes providing a hydrocarbon 202 and initially supplying a material oxide 203 to a reduction site or location 204 where the material oxide is reduced to a high energy density material (HEDM) using the provided hydrocarbon 202 and exported or transported 206 to an energy market 207. These steps may be known as a "reduction process" 220. After transport 206 to the energy market 207, the HEDM is combusted 208 to produce energy 210. The combusted HEDM becomes the material oxide, which is transported 212 back to the reduction process 220 in order to be reduced to the HEDM for re-use as an energy carrier.

In one exemplary embodiment of the energy monetization cycle 200, the provided hydrocarbons 202 are remote or stranded hydrocarbons, such as natural gas that may be initially produced at a remote geographic location from the energy market of interest. Some of the stranded hydrocarbons may currently be burned in the atmosphere (e.g. flaring) and the present disclosure would provide an economic alternative for such resources. Many stranded hydrocarbons are found offshore, so the reduction site or location 204 may be a floating reduction vessel (FRV), or other offshore platform that may be mobile, depending on the situation.

The term "material oxide," as used herein, means any oxide of a material, particularly, an oxide of a HEDM in a solid form. Examples include, but are not limited to boron trioxide (a.k.a. boria) ($B_2O_3$), aluminum oxide (a.k.a. alumina) ($Al_2O_3$), aluminum monoxide (AlO), silicon dioxide ($SiO_2$), carbon dioxide ($CO_2$) or carbon monoxide (CO) (for graphite or diamond) in solid or ash form, and magnesium oxide (MgO).

The combustion step 208 may be performed in any reasonable manner known in the art, such as in a power plant, an automobile or other device, but generally a heat-based oxidation process is contemplated. With respect to boron, a high pressure, nearly pure oxygen gas is the preferred combustion combination.

Figure 3A:
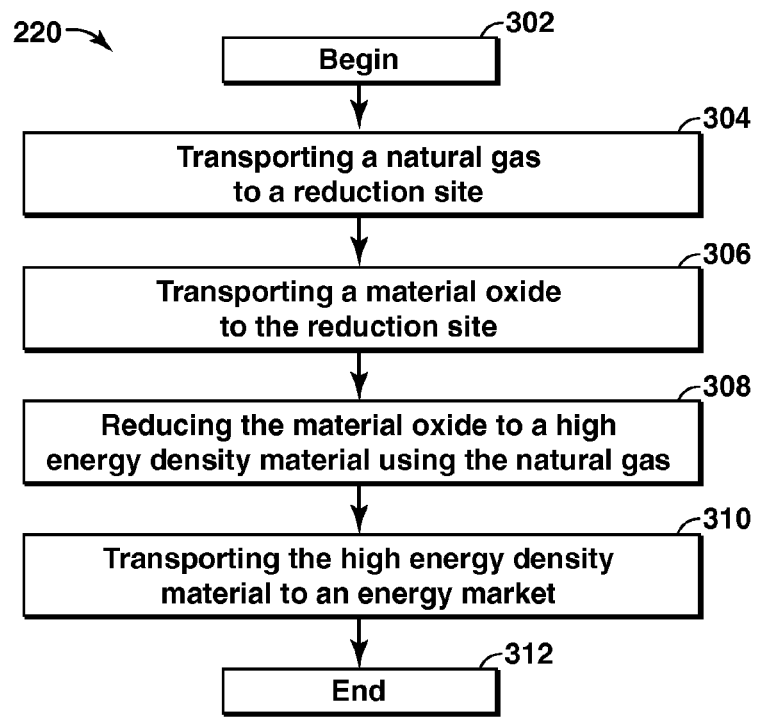
FIGS. 3A-3B are exemplary flow charts of exemplary monetization processes utilizing portions of the energy cycle of FIG. 2.
Figure 3B:
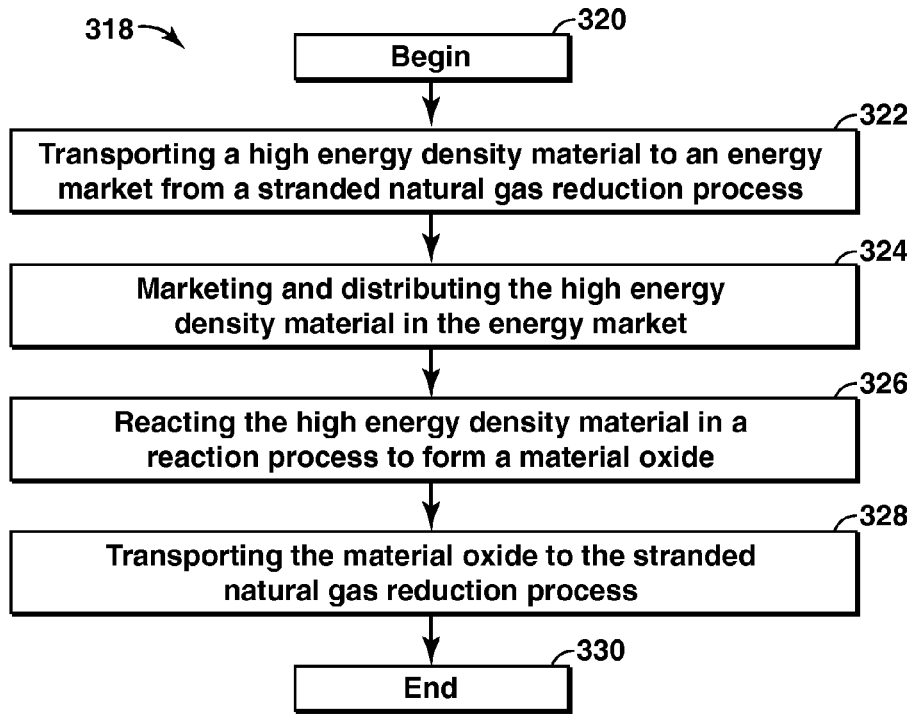

FIGS. 3A-3B are exemplary flow charts of exemplary monetization processes utilizing portions of the energy cycle of FIG. 2. As such, FIGS. 3A-3B may be best understood with reference to FIG. 2. In FIG. 3A, the reduction process 220 begins at block 302, then includes transporting a hydrocarbon (e.g. a remote natural gas) 304 to a reduction site 204 and transporting a material oxide 306 to the reduction site 204. Then, the material oxide is reduced to a high energy density material (HEDM) using the hydrocarbon 308. The HEDM is then exported or transported 310 to an energy market and the reduction process 220 ends at 312.

In one embodiment of the reduction process 220, the hydrocarbon may be transported via a pipeline, a marine vessel, overland vessel, or other similar means. However, the process efficiency is highest when the hydrocarbons are produced or recovered a relatively short distance from the reduction location 204 and transported via pipeline. The distance may be from about one (1) kilometer (km) to about 500 km, or from about 10 km to about 100 km. These distances are not limitations of the process, but affect the overall efficiency of the process. However, this distance should be balanced with the distance of the reduction location 204 from an import/export location, relative distance to energy markets 310, the geography of the location (e.g. rocky terrain may call for a shorter distance), regulatory and geopolitical factors, and other criteria.

The material oxide may be provided from a number of sources. Initially, the material oxide may be extracted (e.g. mined) from the earth and provided to the process 220. However, later shipments of the material oxide may be a result of the reduced HEDM being oxidized in a combustion reaction 208 to produce energy 210 in an energy market. Of course, a combination of these two sources is also possible. Additionally, the location and availability of the material oxide is another efficiency factor in the overall reduction process 220 and the energy cycle 200. It may be efficient to supply more than one type of material oxide (e.g. boron and graphite) to the process 220, depending on availability and process efficiency of the various material oxides.

The reduction process 220 may include a variety of methods of reducing the material oxide utilizing the hydrocarbon. Also, the reduction methods will vary depending on the HEDM desired, the purity desired, and other factors. For example, lower purity boron (90-92% or 95-97%) may be generated using a Moissan process (reduction of boron trioxide with magnesium in a thermite-like reaction) in combination with an upgrading process; high purity boron may be generated by reducing boron halides with hydrogen ($H_2$), or by thermal decomposition of boron tribromide, boron triiodide, or boron hydrides. Some exemplary methods are described in greater detail in BAUDI, ULRICH and FICKTE, RUDOLF, *Boron and Boron Alloys*, Wiley-VCH, pp. 3-4 (2005).

In one particular method, the steps include melting the boria and bubbling sulfur vapour through it at about 1,000 degrees Celsius (° C.). Sulfur readily combines with oxygen, making sulfur dioxide, and with boron, making diboron trisulfide. The boria and diboron trisulfide will sink to the bottom of a vessel in this process, while the sulfur dioxide will rise to the top of the vessel. The heat can come from solar or nuclear power, but is preferably provided by burning the remote hydrocarbon and may be supplemented by other heat or power sources. Mixed boria and boron sulfide emerging from the bottom of the sulfur percolation vessel will enter another vessel and have bromine bubbled up through them resulting in sulfur and boron tribromide. A boron filament may then be grown by exposing boron to heat in the presence of hydrogen and boron tribromide. Again, the heat may be provided by any reliable energy source, but is preferably provided by the remote hydrocarbons 308 (e.g. natural gas recovered from a remote location). The disclosed chemical balances for the steps discussed above are summarized in Table 1 below.

TABLE 1

| Reagents | Products |
| --- | --- |
| $½B_2O_3 + ⅜S_2$ | $½B_2S_3 + ¾SO_2$ |
| $½B_2S_3 + 3/2Br_2$ | $BBr_3 + ⅝S_2$ |
| $BBr_3 + 3/2H_2$ | $B + 3HBr$ |

Another exemplary reduction process may include aluminum, which occurs naturally as bauxite and is typically reduced to alumina ($Al_2O_3$) using the Bayer process, then purified by electrolysis. The hydrocarbon may be used to generate the heat or steam needed for these processes, or may be decomposed to supply the hydrogen gas needed for some of the processes. In particular, the Bayer process includes the steps of: 1) crushing the bauxite ore and mixing the crushed ore with caustic soda to produce a slurry containing very fine particles of ore; 2) heating the slurry to about 230-520° F. (110-270° C.) under a pressure of about 50 psi (340 kPa) in a digester (pressure cooker type of device) for about half an hour to several hours to form a sodium aluminate solution; 3) removing impurities from the sodium aluminate solution by a combination of settling tanks and filters; 4) precipitating crystals of alumina hydrate through the solution to grow larger crystals of alumina hydrate; and 5) calcining (heating to about 2,000° F. (about 1,100° C.) the alumina hydrate to burn off the hydrate, leaving chunks of alumina. Similar to the boria reduction process, the heat needed for the digester and the calcining steps may be provided by the remote hydrocarbons 308.

FIG. 3B illustrates an alternative exemplary monetization process 318. The process 318 begins at 320, then includes transporting a high energy density material (HEDM) 322 to an energy market 207 from a stranded natural gas reduction process 220. Then, marketing and distributing the HEDM 324 in the energy market 207, reacting the HEDM in a reaction process 326 to form a material oxide, and transporting the material oxide 328 to the stranded natural gas reduction process 220. The process 318 ends at block 330.

Figure 4:
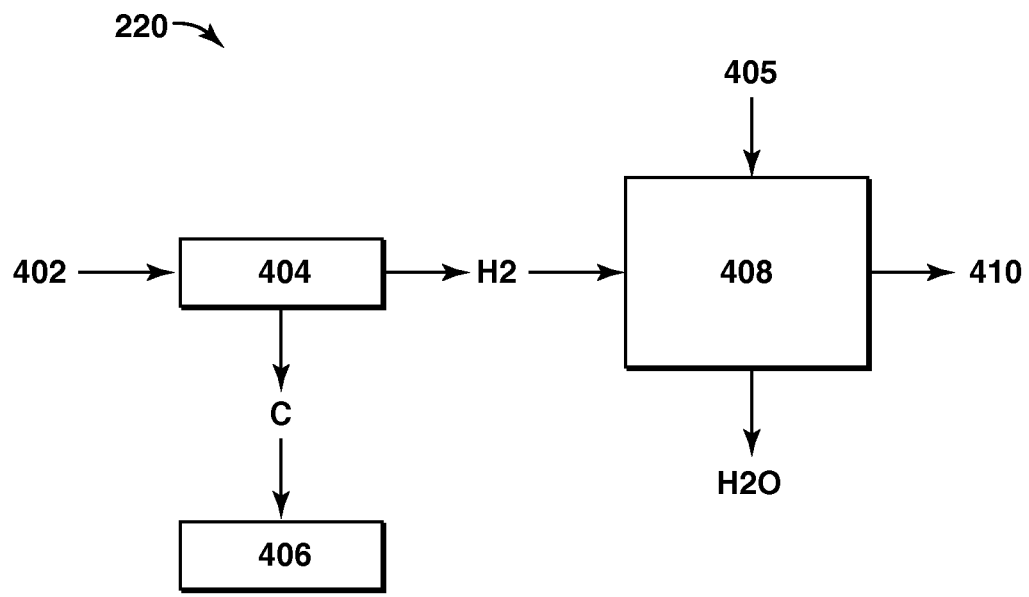
FIG. 4 is an exemplary illustration of an alternative reduction process of the energy cycle of FIG. 2.

FIG. 4 is an exemplary illustration of an alternative reduction process of FIGS. 2 and 3. As such, FIG. 4 may be best understood with reference to FIGS. 2 and 3. The exemplary reduction process 220 includes providing a hydrocarbon 402, then decomposing the hydrocarbon 404 into hydrogen ($H_2$) and carbon (C or $C_2$) using a catalytic disassociation method. The produced carbon is then exported or transported 406 for use as a fuel or sales. A metal oxide is also provided 405. The produced hydrogen is then used as a catalytic reduction promoter in a hydrogen reduction process 408 with the metal oxide to produce water and a high energy density material (HEDM), which is then transported for fuel or sales. For example, the hydrogen may be utilized in the boria reduction process disclosed above or may be mixed with lower quality natural gas to provide a stable flame for heat and power generation.

It should be noted that the reduction process 220 of FIG. 4 fits into the energy cycle 200 in approximately the same manner as the reduction process 220 of FIG. 3A, but includes at least one additional fuel source for transportation. In one exemplary embodiment, some of the produced carbon may be used to power at least a portion of the reduction process, or may all be transported for fuel or sales 406. It is contemplated that the carbon and HEDM may be transported on the same vessel at the same time, different times or different vessels. One benefit of the process is that the vessels for carrying the HEDM or carbon do not need many, if any, special equipment or storage tanks like an LNG or oil tanker would require. Hence, such vessels should be less expensive to build (about the same as a container ship) and operate. Further, the possibility of an environmentally damaging spill is reduced or eliminated depending on the type of HEDM being transported. For example, neither boron or boria react with seawater (or much of anything except at high temperatures and pressures), so, if spilled, the boron or boria would simply sit in a pile at the bottom of the ocean to form an underwater reef. If the water was shallow enough, the spilled boron or boria could be scooped back up and reloaded into a new vessel.

The hydrogen decomposition 404 may be carried out by a variety of processes, including those referred to as "catalytic disassociation methods." Examples of such methods include, but are not limited to thermocatalytic decomposition of methane in a fluidized bed reactor (FBR), thermal dissociation of natural gas (e.g. methane), and the catalytic decomposition methods disclosed in U.S. Pat. No. 7,001,586 (which is herein incorporated by reference). Such methods do not result in the production of carbon dioxide or other harmful gasses and are generally preferable to other known methods, such as steam methane reforming, which produces carbon dioxide as a by-product.

The reduction process 408 may be similar to the hydrogen-based reduction processes mentioned above with respect to the reduction processes 308. For example, the hydrogen may be used as a catalytic reduction promoter in a suspension reduction technology process or other hydrogen reduction process.

Example Case Study

While the processes discussed above may be used for any number of regions and situations, the following is one specific example of the process. This example is only intended to illustrate the disclosed methods and systems and should not be construed to limit the present disclosure.

In a first example, LNG is produced in the Middle East at about 1.2 billion standard cubic feet per day (GSCFD) (or about 9.4 mega-tons per annum (MTA)) and delivered to North America. Assuming a ship speed of 19.5 nautical miles per hour (kts), 12 LNG carriers of the Qflex category (about 210,000 cubic meters ($m^3$)) would be required. Compare a project based on a high energy density material (HEDM) delivering a comparable amount of energy to market. If the HEDM is Mg/MgO, 16 conventional material cargo ships would be needed (number is set by the bulkier load of returning MgO to the gas resource location; only ten ships are required to transport the Mg to the market). Because the conversion efficiency (material reduction) at the gas resource (assumed to be 0.67) is less than that for LNG production (0.92), the production rate would be about 1.65 GSCFD to deliver to same 1.2 GSCFD in the LNG case. This increased rate will require additional wells and a larger material reduction facility. To get the process started, an initial charge of MgO (about 4 mega-tons (MT)) must be purchased. At the end of the project, about 2.5 MT of Mg (made from the MgO) can be sold (it has a much higher unit value than MgO). Considering the reduced shipping and storage costs for the MgO HEDM project, offset somewhat by increased cost of wells, initial purchase of MgO, and an assumed higher cost of the process facility at the gas resource, the potential exists for a project based on HEDM to cost 10-15% less than a comparable LNG project that delivers the same amount of energy to market.

There are other advantages to the HEDM approach. For example, the HEDM concept permits decoupling of production and transport. This could be advantageous in Arctic or other remote areas which are inaccessible (or not easily accessible) for portions of the year due to weather/climate (e.g., ice locked). The solid product can be 'piled up' until the weather window permits access by transport vehicles (e.g., ships, trains, trucks, etc.). Another advantage is that environmental risk in transport is reduced since the cargo in non-polluting and the cargo can be retrieved more easily (it is a solid) if lost. Also, the cargo should have reduced issues with siting of import terminals as the terminals would be operated much like a standard cargo terminal without the need for any special equipment.

While the present techniques of the invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

What is claimed is:
1. A method of monetizing energy, comprising:
transporting a high energy density material to an energy market from a stranded natural gas reduction process location, wherein the high energy density material is obtained from reduction of a material oxide to the high energy density material using a stranded natural gas reduction process.

2. The method of claim 1, further comprising:
distributing the high energy density material in the energy market; and marketing the high energy density material within the energy market.

3. The method of claim 2, further comprising producing energy by reacting the high energy density material in a reaction process, wherein the reaction process produces at least the material oxide.

4. The method of claim 3, further comprising:
collecting the material oxide; and
transporting the material oxide to the stranded natural gas reduction process location.

5. The method of claim 4, further comprising:
providing a stranded natural gas resource;
providing the material oxide;
transferring energy in a stranded natural gas resource to the high energy density material by reducing the material oxide to the high energy density material using the stranded natural gas reduction process at the stranded natural gas reduction process location; and
transporting the high energy density material to the energy market.

6. The method of claim 5, further comprising repeating the steps of claims 1-5 in a cycle.

7. The method of one of claim 1, wherein the high energy density material has an energy density greater than 1.0 mega-joules squared per liter per kilogram divided by 1,000 ($MJ^2$/kg/L/1000).

8. The method of claim 1, wherein the high energy density material is one of magnesium (Mg), boron (B), silicon (Si), carbon (C), zinc (Zn), polyethylene plastic, and aluminum (Al).

9. The method of claim 1, wherein the material oxide is transported by one of a marine or overland bulk carrier.

10. The method of claim 3, wherein the reaction process is conducted at one of a fuel cell, gas turbine, industrial power plant, commercial power plant, and internal combustion engine.

11. The method of claim 6, wherein the stranded natural gas reduction process is selected from the group consisting of: the Bayer process using the stranded natural gas to provide heat to the process, a boria reduction process using the stranded natural gas to provide heat, a boria reduction process using the stranded natural gas to provide disassociated hydrogen for use in the process as a fuel or a reactant.

12. A method of monetizing energy, comprising:
transporting a stranded natural gas resource to a reduction site;
transporting a material oxide to the reduction site;
reducing the material oxide to a high energy density material using the stranded natural gas resource in a stranded natural gas reduction process at the reduction site; and
transporting the high energy density material to an energy market.

13. The method of claim 12, further comprising:
marketing a high energy density material to an energy market; and
distributing the high energy density material within the energy market.

14. The method of claim 13, further comprising:
producing energy by reacting the material in a reaction process, wherein the reaction process produces at least the material oxide; and
transporting the material oxide to the reduction site.

15. The method of claim 14, wherein the steps of claim 14 are repeated in cycle.

16. The method of claim 12, wherein the high energy density material has an energy density greater than or equal to about 40 mega-joules per liter (MJ/l).

17. The method of claim 14, wherein the reaction process is a combustion process.

18. The method claim 12, wherein the natural gas reduction process comprises:
producing hydrogen ($H_2$) from the natural gas; and
using the produced hydrogen as a catalytic reduction promoter to reduce the material oxide to the high energy density material.

19. The method of claim 18, wherein the hydrogen is produced by a process selected from the group of processes consisting of: a methane decomposition process, a steam natural gas reforming process, and a catalytic dissociation of natural gas process.

20. The method of claim 12, wherein the material oxide reduction process is one of the processes selected from the group consisting of: a Moissan process combined with an upgrading process, thermal decomposition of the material oxide, reducing the material oxide using hydrogen ($H_2$) as a catalytic reduction promoter, a Bayer process combined with an electrolysis process, and any combination thereof.

21. A method of producing energy, comprising:
providing a remote hydrocarbon and a material oxide;
decomposing the remote hydrocarbon into hydrogen ($H_2$) and carbon (C);
utilizing the carbon for one of fuel and sales;
reducing the material oxide to a high energy density material using the hydrogen; and
utilizing the high energy density material for one of fuel and sales.

22. The method of claim 21, wherein the method of decomposing the remote hydrocarbon is a catalytic dissociation method.

23. The method of claim 22, wherein the hydrogen is used as a catalytic reduction promoter to reduce the material oxide to a high energy density material.

24. The method of claim 21, wherein the remote hydrocarbon is decomposed by a process selected from the group of processes consisting of: a methane decomposition process, a steam natural gas reforming process, and a catalytic dissociation of natural gas process.

* * * * *